R. D. MUNSON.
Attaching Hubs to Axles.
No. 5,995.
Patented Jan. 2, 1849.
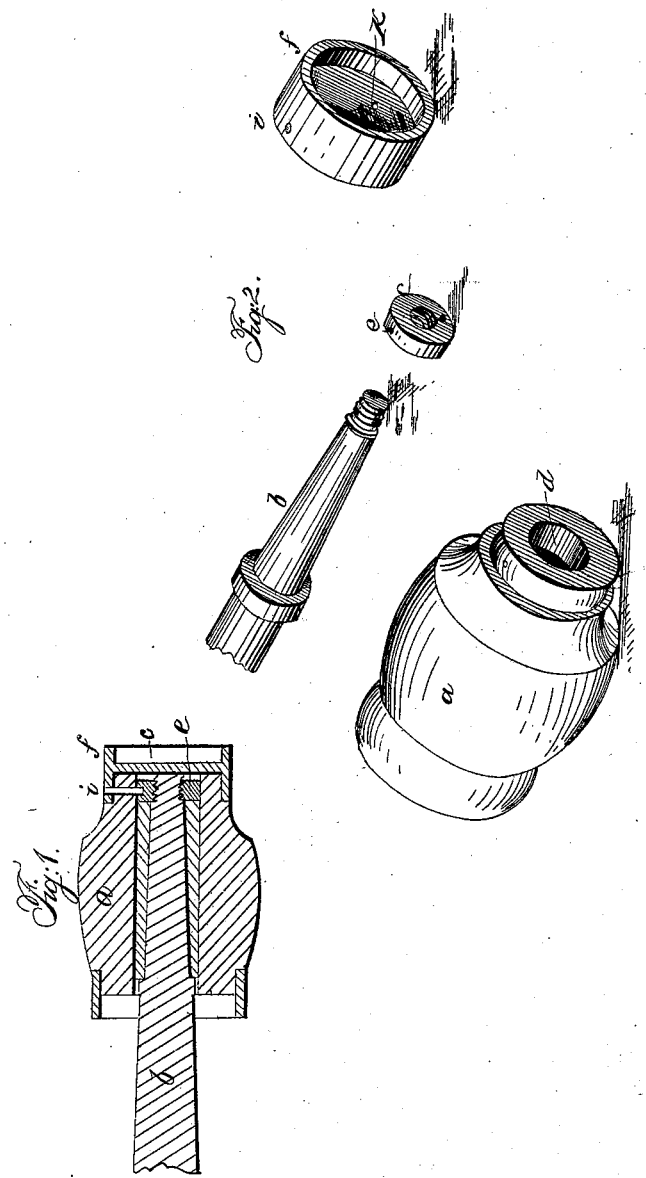

UNITED STATES PATENT OFFICE.

R. D. MUNSON, OF WILLESTON, VERMONT.

ATTACHING AND DETACHING HUBS AND AXLES.

Specification of Letters Patent No. 5,995, dated January 2, 1849.

*To all whom it may concern:*

Be it known that I, R. D. MUNSON, of Williston, in the county of Chittenden and State of Vermont, have invented certain new and useful Improvements in Forming Hubs of Carriage-Wheels and Attaching them to Axles, and that the following is a full, clear, and exact description of the principle or character which distinguishes them from all other things before known and of the usual manner of making, modifying, and using the same, reference being had to the accompanying drawings, which illustrates the same, in which—

Figure 1, is a section through the hub and axle Fig. 2, is a view of the parts separated.

The same letters are used to designate like parts in both figures.

The nature of my improvement consists in covering the end of the hub of a carriage wheel permanently, so as to entirely exclude the dirt by an immovable cap, and at the same time furnish a ready means for disengaging the wheel from the axle, without rendering it liable to come off accidentally.

The construction is as follows:—The hub (*a*) and axle (*b*) are in form like those in ordinary use; the axle has a thread cut on its outer end, onto which a nut (*c*) screws; this nut is round, as shown at Fig. 2, (*c*) and fits into the recess (*d*,) in the hub; in or near the edge of the nut there is one or more holes (*e*). The outer band and cap are formed in one piece (*f*,) and it is firmly affixed to the hub after the nut (*c*) is put in place, by screws, on or otherwise; one screw hole (*i*), by which the band is fastened, passes clear through to the recess (*d*) and when the screw is removed, a pin can be passed into said hole, and down into the hole (*e*) in the nut, which will cause the nut to turn with the hub and thereby, turning the wheel backward, it is detached; when the wheel is again put on, the pin is removed, and the screw inserted in the band, the hub then plays around the nut without turning it. As a modification, a hole might be made in the face of the cap, at (*k*), and also in the nut opposite, which would answer nearly the same purpose, said holes being covered with a stopper.

Having thus fully described my improved method of forming hubs of carriage wheels, and attaching them to axles, what I claim therein as new and for which I desire to secure Letters Patent, is—

The employment of the solid cap and circular nut combined, and arranged as herein described.

R. D. MUNSON.

Witnesses:
WM. GREENOUGH,
J. J. GREENOUGH.